United States Patent
Rajagopal et al.

(10) Patent No.: US 9,464,464 B2
(45) Date of Patent: Oct. 11, 2016

(54) DRIVE UNIT

(71) Applicant: Kiekert AG, Heiligenhaus (DE)

(72) Inventors: Mandya Rajagopal, Farmington Hills, MI (US); Jim Zhuang, Canton, MI (US); David Fischer, South Lyon, MI (US)

(73) Assignee: Kiekert AG, Heiligenhaus (DE)

( * ) Notice: Subject to any disclaimer, the term of this patent is extended or adjusted under 35 U.S.C. 154(b) by 373 days.

(21) Appl. No.: 14/027,669

(22) Filed: Sep. 16, 2013

(65) Prior Publication Data

US 2015/0076838 A1    Mar. 19, 2015

(51) Int. Cl.
| | |
|---|---|
| *E05B 81/06* | (2014.01) |
| *F16C 27/08* | (2006.01) |
| *E05B 81/16* | (2014.01) |
| *F16H 57/022* | (2012.01) |
| *F16H 57/021* | (2012.01) |
| *F16H 57/12* | (2006.01) |
| *F16H 57/02* | (2012.01) |

(52) U.S. Cl.
CPC ............. *E05B 81/06* (2013.01); *E05B 81/16* (2013.01); *F16H 57/022* (2013.01); *F16H 2057/0213* (2013.01); *F16H 2057/0221* (2013.01); *F16H 2057/02082* (2013.01); *F16H 2057/127* (2013.01); *Y10T 292/1082* (2015.04)

(58) Field of Classification Search
CPC .......... E05B 81/06; F16H 2057/0221; F16H 2057/0213; F16H 2057/127
USPC ............................................ 310/90; 384/425
See application file for complete search history.

(56) References Cited

U.S. PATENT DOCUMENTS

| | | | | |
|---|---|---|---|---|
| 3,169,245 A | | 2/1965 | Cutler | |
| 3,549,218 A | * | 12/1970 | Cagnon | F16C 17/08 384/425 |
| 3,726,575 A | * | 4/1973 | Moorman | F16B 21/16 310/90 |
| 4,742,726 A | | 5/1988 | Adam et al. | |
| 4,993,277 A | * | 2/1991 | Adam | F16C 17/08 74/409 |
| 5,169,245 A | | 12/1992 | Harada et al. | |
| 5,212,999 A | * | 5/1993 | Kitada | B60S 1/08 384/223 |
| 5,634,677 A | * | 6/1997 | Buscher | E05B 81/06 292/216 |
| 5,811,902 A | * | 9/1998 | Sato | B60T 8/4022 310/51 |
| 5,886,437 A | * | 3/1999 | Bohn | B60S 1/16 310/83 |
| 7,467,565 B2 | * | 12/2008 | Oberle | F16C 17/08 74/409 |

FOREIGN PATENT DOCUMENTS

| | | | | | |
|---|---|---|---|---|---|
| DE | 3329120 | * | 2/1986 | ............ | F16H 57/12 |
| DE | 10242570 | * | 3/2004 | ............ | F16C 17/08 |
| EP | 0 133 527 B2 | | 7/1984 | | |
| EP | 0 394 512 A1 | | 4/1989 | | |
| EP | 0 764 099 B1 | | 2/1996 | | |
| GB | 1030838 | * | 5/1966 | ............ | F16C 17/04 |

* cited by examiner

*Primary Examiner* — Burton Mullins
(74) *Attorney, Agent, or Firm* — Renner, Otto, Boiselle & Sklar, LLP

(57) ABSTRACT

A drive unit for automotive applications, specifically for application with or in combination with a motor vehicle door lock, a housing (5), a motor (1) as well as an associated motor shaft (2), and with at least one spring element (6) generating an axial force at one end of the motor shaft (2), with the spring element (6) being located in at least one receptacle (7, 8) in the housing (5). In a top view, the spring element (6) has essentially a T-shaped design with an end plate (6a) and cantilevers (6b) on both sides, with the end plate (6a) acting upon the motor shaft (2), and at least the cantilevers (6b) being arranged in the receptacle (7, 8).

12 Claims, 3 Drawing Sheets

DRIVE UNIT

The invention relates to a drive unit for automotive applications, specifically for application with or in combination with a motor vehicle door lock, a housing, a motor, as well as an associated motor shaft, and with at least one spring element generating an axial force arranged at one end of the motor shaft, with the spring element being located in at least one receptacle in the housing.

BACKGROUND

Such drive units can be used, for example, for driving windshield wipers, electric windows, mirrors, seats, as well as entire doors. With special preference, such drive units can be used for realizing a central locking function in motor vehicle door locks. Advantageously, such drive units are also used in conjunction with so-called electric locks, i.e. such motor vehicle door locks where an obligatory locking system is opened by means of a motor.

For this purpose, drive units of this type are often equipped with a gear, specifically a worm gear, on the output side. In this case, on the output side on the motor shaft, a worm shaft is arranged that meshes with the outer teeth of a worm gear. Rotary movements of the worm gear in different directions have the effect of subjecting the motor shaft to an alternating axial load during its operation. Due to these different axial loads, in the prior art knocking noises are generated when the motor shaft exhibits longitudinal play between a motor-side and a gear-side axial stop.

In order to control this longitudinal or axial play of the motor shaft, different solutions are pursued in the prior art. EP 0 764 099 B1, which characterizes the type, discloses a drive unit with an electric drive motor followed by a worm gear. In addition, pre-tensioning spring elements are provided that push elastically against the free face surface of the worm shaft. These spring elements consist of a leaf-spring-type spring element that is aligned transversely to the axis of rotation of the worm shaft and is fixed with its opposite end edges on shoulders of the associated housing. Between the end edges, there is a central section that contacts under pre-tension the face surface of the worm shaft.

Comparable drive units are disclosed in U.S. Pat. No. 5,169,245 and EP 0 133 527 B2. In the former case, a motor shaft is provided in a drive unit that is supported on a spring element via a ball. The variant according to EP 0 394 512 A1 works with an axial disk that is arranged axially in face of a shaft end of the motor.

Such designs in the prior art are structurally relatively complex and need to be manufactured in several stages. According to U.S. Pat. No. 3,169,245, not only is an end-side steel ball provided, but there is also a plate contacting the ball that is supported in a mount by means of a spiral spring. EP 0 394 512 A1 operates with a specially shaped start-up disk that is additionally equipped with an upstream set screw that is supported on the housing. The final citation, EP 0 764 099 B1, employs a spring element that, in a top view, is essentially shaped like a rectangle whose end edges on the shorter sides of the rectangle are bent at an angle of at least 30° towards the same side out of the plane of a central section. This, too, is costly in terms of manufacture and assembly.

SUMMARY

The present invention addresses the technical problem of further developing a drive unit of this type in such a way that enables an axial support with perfect spring action to be provided for the motor shaft, with the help of which the motor shaft is supported with a spring-action compensation of the axial play for the purpose of noise reduction, with the goal being an especially cost-efficient embodiment of simple design.

In solving this technical problem, a typical drive unit according to the invention is characterized in that, in a top view, the spring element has essentially a T-shaped design with an end plate and cantilevers on both sides, with the end plate acting upon the motor shaft and with at least the cantilevers being arranged in the receptacle.

Usually, the receptacle does not serve only for accepting and holding the cantilevers on both sides. Rather, the receptacle is usually designed, additionally and according to the invention, to also accept the end plate, at least the foot thereof. This is usually accomplished by arranging the two cantilevers along with the end plate extending in between them predominantly transversely to the motor shaft, according to a top view of the drive unit. In this way, the end plate makes contact under pre-tension with the face surface of the motor shaft.

In order to realize this in detail, the cantilevers on both sides are usually each inserted into an associated slot receptacle, at least partially with a positive fit. This makes it possible for the end plate located between them to act with spring action on the motor shaft. This means that the two cantilevers function predominantly as fixed supports for the spring element that, in a top view, is T-shaped. The end plate, on the other hand, in elastically connecting the two cantilevers serving as fixed supports, is able to exert the desired pre-tension in the axial direction on the motor shaft with which it is in contact.

This is usually accomplished by providing the cantilevers on both sides with a material thickness that exceeds the material thickness of the end plate.

In addition, provisions are made for the two cantilevers to project by the same measure relative to a top and a bottom sides of the end plate. Also, the length of the cantilevers on both sides is usually less than half the length of the end plate. Generally, the cantilevers on both sides extend from the head of the T-shaped spring element in the direction of the foot of the spring element. For the most part, the T-shaped spring element may have an axially symmetrical shape.

In conjunction with the end plate that practically connects the two cantilevers, the cantilevers on both sides define in between them a recess with a U-shaped cross section. By means of this U-shaped recess, the motor shaft can be provided with a perfect end-side support, i.e. between the two cantilevers on both sides that, like raised ribs or dams, limit if not prevent a possible lateral deflection of the motor shaft.

The motor shaft preferably contacts one T-shaped spring element with each of its two ends. As a consequence, this means that at each of the ends with the T-shaped spring element, a receptacle is provided in the housing for accepting the T-shaped spring element in question. Generally, on its output side, the motor shaft is equipped with a worm gear. Typically, this worm gear consists of a worm shaft located on the motor shaft and of a worm gear wheel. The worm shaft meshes with the outer teeth of the worm gear wheel.

According to the invention, different clockwise and counter-clockwise rotary movements of the worm gear wheel and the associated play in the worm gear as well as a possible axial play of the motor shaft can be absorbed by the T-shaped spring element, or by the two T-shaped spring elements provided on both sides at respective ends of the motor shaft.

Generally, the T-shaped spring element is made of steel, preferably of spring steel, and most preferably of a sintered material. In conjunction with an axially symmetrical design and the fact that the two cantilevers on both sides of the central end plate are essentially longitudinally extending areas of material that is thicker than that of the end plate, an extremely simple and cost-efficient production becomes possible. In the simplest case, the T-shaped spring element according to the invention may consist of a simple stamped steel part. Its installation may also be problem-free. However, the T-shaped spring element may also consist of a sintered component, preferably one containing a metallic material, for example a ferrous material.

The spring element that is T-shaped in a top view can be inserted with its two cantilevers on both sides into associated slot receptacles, at least partially with a positive fit. Thereby, each of the cantilevers functions like a fixed support. As a consequence, the end plate provided between the two cantilevers is able to act with a spring action on the motor shaft. The material thickness of the cantilevers on both sides preferably exceeds the material thickness of the end plate. In addition, the design preferably provides for the cantilevers to project by approximately the same measure beyond the top as well as the bottom side of the end plate. In this way, the same spring characteristics or consistent spring rates on the part of the end plate can be expected, specifically for the two cases that the end plate curves either inward or outward in relation to the cantilevers that are fixed or held in fixed position.

As a result, a drive unit is made available that, to begin with, is equipped with a T-shaped spring element that can be of an extremely simple and cost-efficient design. Its installation can also be simple because it is merely necessary to insert the two cantilevers on both sides into associated slot receptacles, at least partially with a positive fit. At its foot, the end plate is supported on the inside of the receptacle, not necessarily requiring a positive fit. Thereby the end plate is able to perform back and forth movements at its foot within the limits determined by the receptacle, which supports its spring effect.

BRIEF DESCRIPTION OF THE DRAWINGS

Below, the invention is explained in detail with reference to a drawing showing a single embodiment.

DETAILED DESCRIPTION

The figures show a drive unit for automotive applications. In fact, it concerns a drive unit that is not restricted to a central locking system inside a motor vehicle door locks. The drive unit shown in FIG. 1 may act on a central locking lever, switching it at least between the functional states of "locked" and "unlocked", as described in detail in the patent U.S. Pat. No. 5,634,677 of the applicant, which is hereby incorporated by reference.

Figure 1:
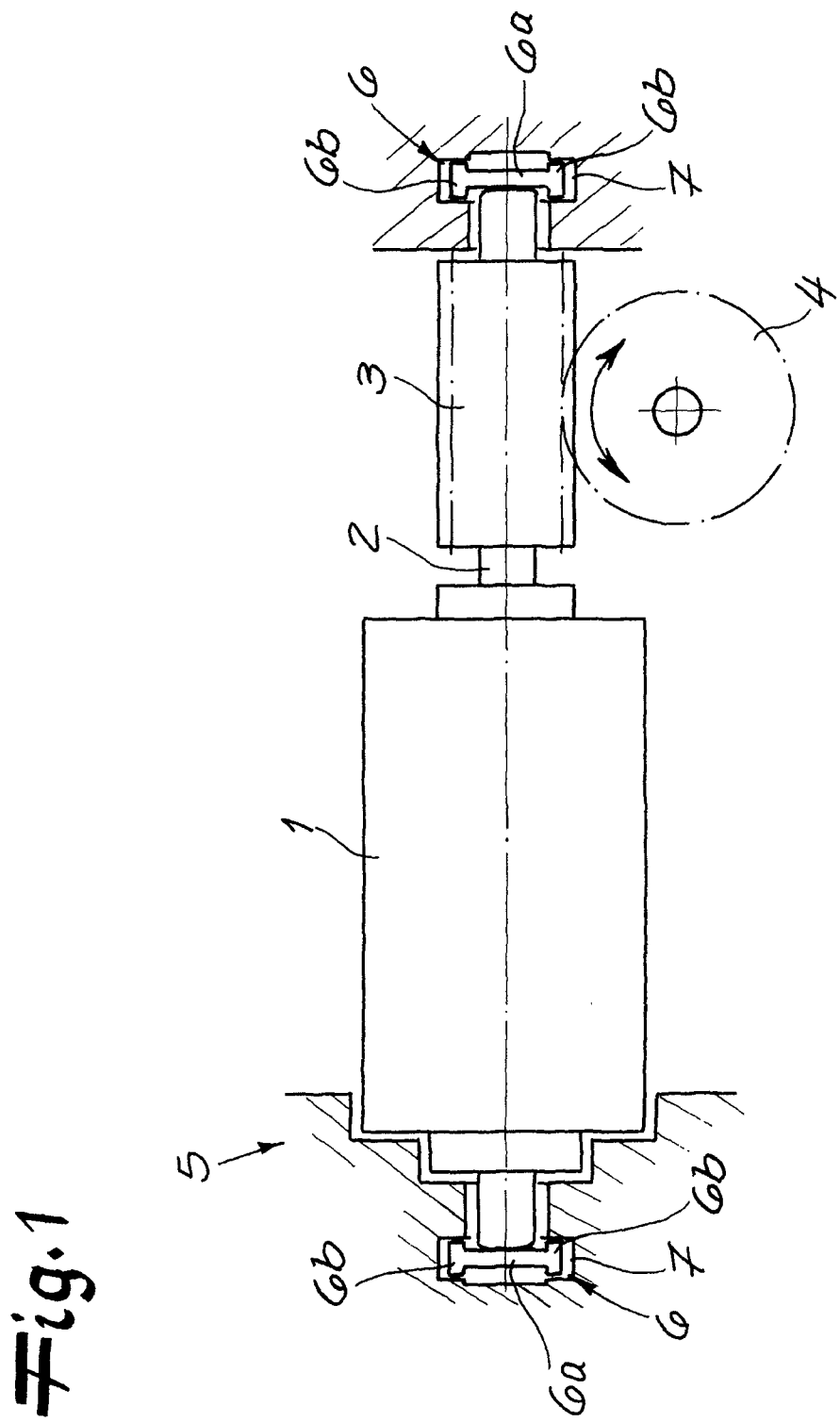
FIG. 1 shows an overview of an exemplary drive unit in a top view.

The illustrated exemplary drive unit is composed of a motor 1 with an associated motor shaft 2. The top view or front view of FIG. 1 show that the motor shaft 2 protrudes from the motor 1 on both sides. This, of course, should only be taken as an example. In addition, on the output side of the motor 1, a gear 3, 4 is provided. This gear 3, 4 preferably is a worm gear 3, 4.

The worm gear 3, 4 is composed of a worm shaft 3 arranged on the motor shaft 2 and a worm gear wheel 4. The worm shaft 3 meshes with the outer teeth on the worm gear wheel 4. This enables the worm gear 4 to perform the counter-clockwise and clockwise movements indicated in FIG. 1 around their associated axis.

Since the motor shaft 2 in relation to the motor 1 as well as the worm gear 3, 4 generate an axial play of the motor shaft 2, a spring element 6 is additionally provided or two spring elements 6 in this specific example. The entire drive unit in conjunction with the associated spring element 6 is contained in an associated housing 5. The figure shows that the motor shaft 2 is equipped with an associated spring element 6 at both of its ends. The spring element 6 is arranged in a receptacle 7, 8 in the housing 5. The receptacle 7, 8 consists of two slot receptacles 7 and one bar receptacle 8.

Figure 2:
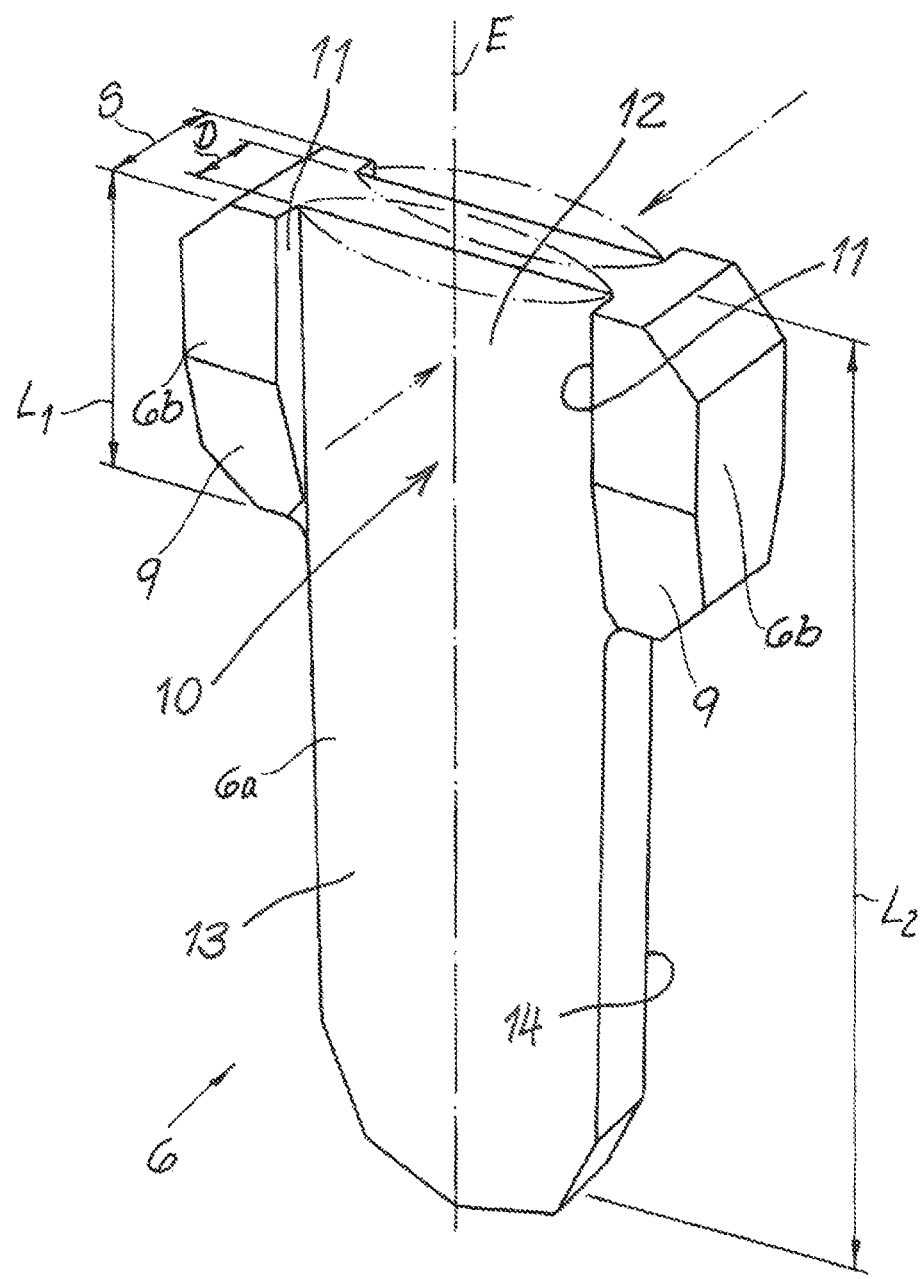
FIG. 2 shows a perspective view of the T-shaped spring element.

The perspective view of the exemplary spring element 6 in FIG. 2 shows that the spring element 6 is designed, according to the invention and as shown in the (angled) top view in FIG. 2, as a T-shaped part with an end plate 6a and two cantilevers 6b on both sides. In conjunction with the end plate 6a arranged between them, the two cantilevers 6b form the predominantly a horizontal limb (head) of the T while the end plate 6a defines the vertical limb (stem) of the T. The end plate 6a acts on the motor shaft 2. For this purpose, the motor shaft 2 contacts with its ends, respectively with the face surfaces of its ends, the corresponding end plate 6a of the T-shaped spring element 6 placed in this location in the housing 5.

Figure 3:
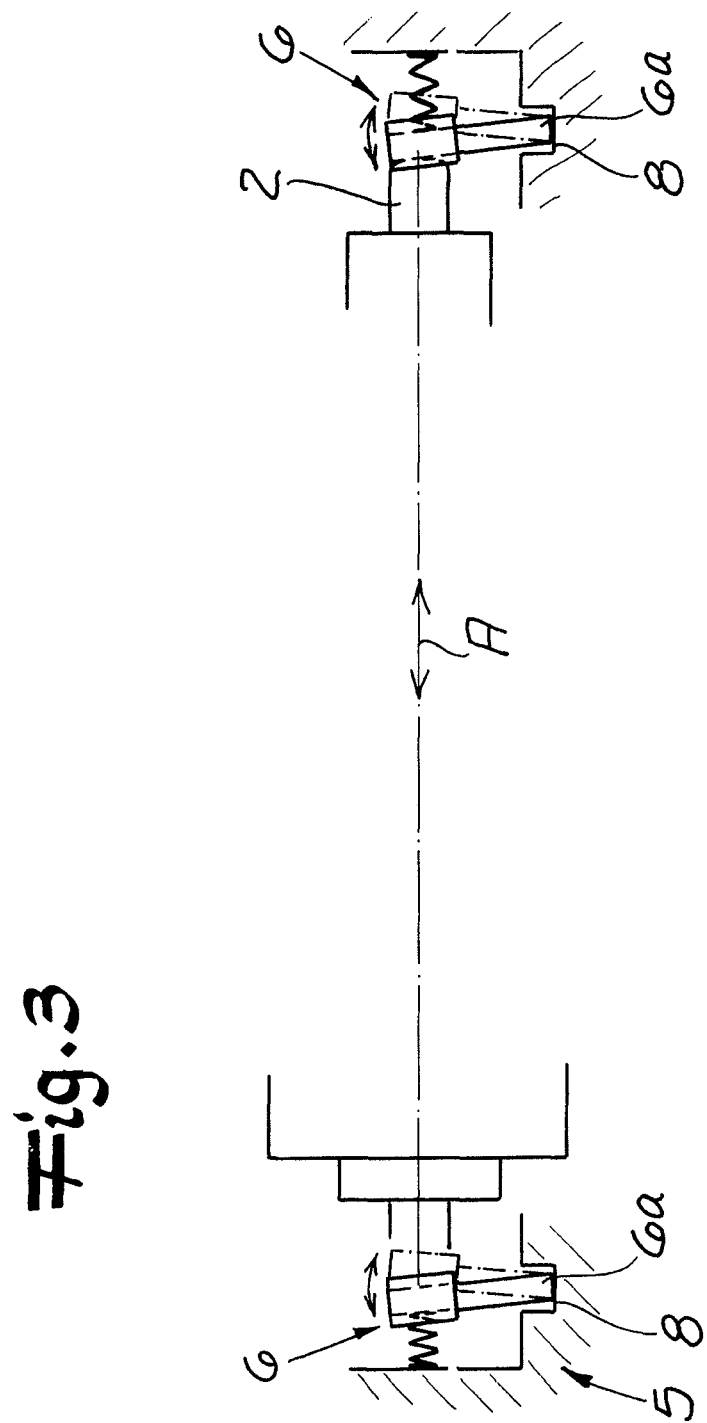
FIG. 3 shows a side view of the drive unit according to FIG. 1 schematically in the area of the ends of the motor shaft for different functional states.

It can be seen that at least the cantilevers 6b of the T-shaped spring element 6 are arranged in the receptacle 7, 8. In this embodiment, the two cantilevers 6b of the T-shaped spring element 6 are each held in the associated slot receptacle 7, which is achieved by means of an at least partially positive-fit insertion, or by means of an insertion with a certain amount of play. This enables the endplate 6a extending between the two cantilevers 6b on both sides to act with spring action on the motor shaft 2. The end plate 6a itself is held at its foot in the bar receptacle 8, as shown in FIG. 3. Usually, a positive fit is not intended in this location in order to enable the T-shaped spring element 6 to perform the spring-action movements shown in an exaggerated view in FIG. 3.

The top view of the drive unit in FIG. 1 shows clearly that, in this view, the two cantilevers 6b with the end plate 6a extending in between them are arranged predominantly transversely to the motor shaft 2. Because of this, each end plate 6a contacts with pre-tension the associated face surface of the ends of the motor shaft 2. This enables the T-shaped spring element 6 to absorb with spring action possible movements of the motor shaft 2 in the axial direction A indicated in FIG. 3. In reality, such axial movements of the motor shaft 2 have the effect that each of the T-shaped spring elements 6 contacting the face surface of the ends of the motor shaft 2 is deformed in the manner shown in an exaggerated view in FIG. 2.

The perspective view according to FIG. 2 shows that each of the cantilevers 6b on both sides have a material thickness S that exceeds the material thickness D of the end plate 6a.

The illustrated cantilevers 6b are each designed to project by an equal measure beyond a top side 13 and a bottom side 14 of the end plate 6a. The illustrated T-shaped spring element 6 is designed to be axially symmetrical in relation to the plane of symmetry E shown in FIG. 2. This makes it easy to produce the T-shaped spring element 6 as a whole in one step and cost-efficiently by means of a simple stamping steel. Additional sloped surfaces 9 on the underside of the cantilevers 6b on both sides ensure that the T-shaped spring element 6 can be easily inserted into the associated slot receptacles 7, either with an at least partial positive fit or with a certain amount of play.

In this way, the two cantilevers 6b on both sides function like fixed supports after the T-shaped spring element has been inserted into the receptacle 7, 8, with each face surface of the motor shaft 2 contacting with spring action the end plate 6a that elastically connects the fixed supports formed in this way. FIG. 2 also shows that the cantilevers 6b on both sides each have a length L1 that is less than half of the length L2 of the end plate 6a.

Compared with the cantilevers 6b on both sides, the end plate 6a not only can be curved (bowed) inward or outward with spring action if the motor shaft 2 exerts a corresponding axial force, but also the end plate 6a can be simultaneously able to tilt in relation to the bar receptacle 8 on the foot end, as indicated in FIG. 3. In this way, the motor shaft 2, or the face surface of the motor shaft 2 provided on both ends, can be perfectly aligned and supported in case of inevitable axial movements of the motor shaft 2. The circumstance that the cantilevers 6b on both sides create in between themselves a recess with a U-shaped cross section 6a, 6b for the support of the motor shaft 2 at its ends is a contributing factor. In fact, the U-shaped recess 10 is composed by the two U-shape limbs 11 in the form of the cantilevers on both sides, on the one hand, and of the end plate 6a acting as a U-base 12 in this respect, on the other hand."

What is claimed is:

1. A drive unit for automotive applications with or in combination with a motor vehicle door lock, the drive unit including a housing, a motor with an associated motor shaft, and at least one spring element generating an axial force at one end of the motor shaft, wherein the spring element is located in at least one mount in the housing, and wherein the spring element has essentially a T-shaped design with an end plate and cantilevers on both opposing sides of the end plate, with the end plate acting upon the motor shaft, and at least the cantilevers being arranged in a receptacle, and
wherein the end plate defines a U-shaped recess formed by the cantilevers being U-shape limbs on opposing sides of a U-base of the end plate to support the end of the motor shaft.

2. The drive unit according to claim 1, wherein the two cantilevers along with the end plate extending in between them are arranged predominantly transversely to the motor shaft so that the end plate contacts under pretension the face surface of the motor shaft.

3. The drive unit according to claim 1, wherein the receptacle accepts not only the cantilevers on both sides of the T-shaped spring element but also at least a foot section of the end plate.

4. The drive unit according to claim 1, wherein the cantilevers on both sides are each inserted into an associated slot receptacle, thereby enabling the end plate located between them to act with spring action on the motor shaft.

5. The drive unit according to claim 1, wherein the cantilevers on both sides have a material thickness that exceeds the material thickness of the end plate.

6. The drive unit according to claim 5, wherein the cantilevers on both sides project by the same measure beyond a top side and a bottom side of the end plate.

7. The drive unit according to claim 1, wherein the cantilevers on both sides each have a length that is less than half of the length of the end plate.

8. The drive unit according to claim 1, wherein the cantilevers on both sides extend from a head of the T-shaped spring element toward a foot thereof in a direction along a stem of the T-shaped spring element.

9. The drive unit according to claim 1, wherein the T-shaped spring element is of axially symmetrical design in relation to a plane of symmetry.

10. The drive unit according to claim 1, wherein the T-shaped spring element is made of steel, preferably spring steel, and most preferably a sintered material.

11. The drive unit according to claim 1, wherein the motor shaft contacts a respective said T-shaped spring element with each of its two ends.

12. The drive unit according to claim 1, wherein the motor shaft is equipped with a worm gear at its output side.

* * * * *